(12) United States Patent
Ndem et al.

(10) Patent No.: US 8,799,868 B2
(45) Date of Patent: Aug. 5, 2014

(54) METHOD AND APPARATUS FOR THE PERFORMING UNIT TESTING OF SOFTWARE MODULES IN SOFTWARE SYSTEMS

(75) Inventors: Guy Collins Ndem, München (DE); Abbas Abdelhamid Abbas Tahir, München (DE)

(73) Assignee: Siemens Aktiengesellschaft, Munich (DE)

( * ) Notice: Subject to any disclaimer, the term of this patent is extended or adjusted under 35 U.S.C. 154(b) by 263 days.

(21) Appl. No.: 13/088,678

(22) Filed: Apr. 18, 2011

(65) Prior Publication Data

US 2011/0258601 A1 Oct. 20, 2011

(30) Foreign Application Priority Data

Apr. 20, 2010 (EP) .................................. 10004187

(51) Int. Cl.
*G06F 9/44* (2006.01)
(52) U.S. Cl.
USPC ........... 717/126; 717/124; 717/125; 717/127; 717/128
(58) Field of Classification Search
None
See application file for complete search history.

(56) References Cited

U.S. PATENT DOCUMENTS

| | | | | |
|---|---|---|---|---|
| 5,604,895 A | * | 2/1997 | Raimi | 703/13 |
| 5,729,676 A | * | 3/1998 | Inoue | 714/38.1 |
| 5,758,061 A | * | 5/1998 | Plum | 714/35 |
| 6,691,249 B1 | * | 2/2004 | Barford et al. | 714/25 |
| 7,480,900 B1 | * | 1/2009 | Zhou et al. | 717/132 |
| 7,624,301 B2 | * | 11/2009 | Yamaguchi et al. | 714/5.11 |
| 7,861,226 B1 | * | 12/2010 | Episkopos et al. | 717/124 |
| 8,087,005 B2 | * | 12/2011 | Pal et al. | 717/126 |
| 8,146,059 B2 | * | 3/2012 | Ponsford et al. | 717/124 |
| 8,230,401 B2 | * | 7/2012 | Branca et al. | 717/135 |
| 8,276,123 B1 | * | 9/2012 | Deng et al. | 717/125 |
| 2002/0129035 A1 | * | 9/2002 | Hayes et al. | 707/104.1 |
| 2003/0009740 A1 | * | 1/2003 | Lan | 717/102 |
| 2003/0233635 A1 | * | 12/2003 | Corrie | 717/124 |
| 2005/0229044 A1 | * | 10/2005 | Ball | 714/38 |
| 2007/0168727 A1 | * | 7/2007 | Fournier et al. | 714/25 |
| 2008/0092120 A1 | * | 4/2008 | Udupa et al. | 717/124 |
| 2008/0288925 A1 | * | 11/2008 | Huang et al. | 717/128 |
| 2009/0144698 A1 | * | 6/2009 | Fanning et al. | 717/120 |
| 2009/0265694 A1 | * | 10/2009 | Bakowski | 717/131 |
| 2010/0095274 A1 | * | 4/2010 | Sadowsky | 717/124 |
| 2010/0287534 A1 | * | 11/2010 | Vangala et al. | 717/124 |

OTHER PUBLICATIONS

Masuyama, H., et al., "A New Method of Software Structural Testing by Path Analysis", Systems and Computers in Japan, vol. 17, No. 4pp. 34-42, Apr. 1, 1986.

* cited by examiner

*Primary Examiner* — Isaac Tecklu
(74) *Attorney, Agent, or Firm* — King & Spalding L.L.P.

(57) ABSTRACT

In a method and apparatus of performing unit testing of a software module, the method provides for reading, by a computer, target data and discovering of functional aspects of a piece of software code, dividing the target data into chunks, estimating a plurality of decision/condition statements of the software code, estimating an amount of possible test cases based on the program inputs, defining a data set over the plurality of identified decisions/conditions, finding subset relationships between all the defined data sets, defining a plurality of optimal data sets, classifying the condition of the plurality of optimal data sets by category, refining the plurality of optimal data sets, and calculating the best amount of data sets.

20 Claims, 9 Drawing Sheets

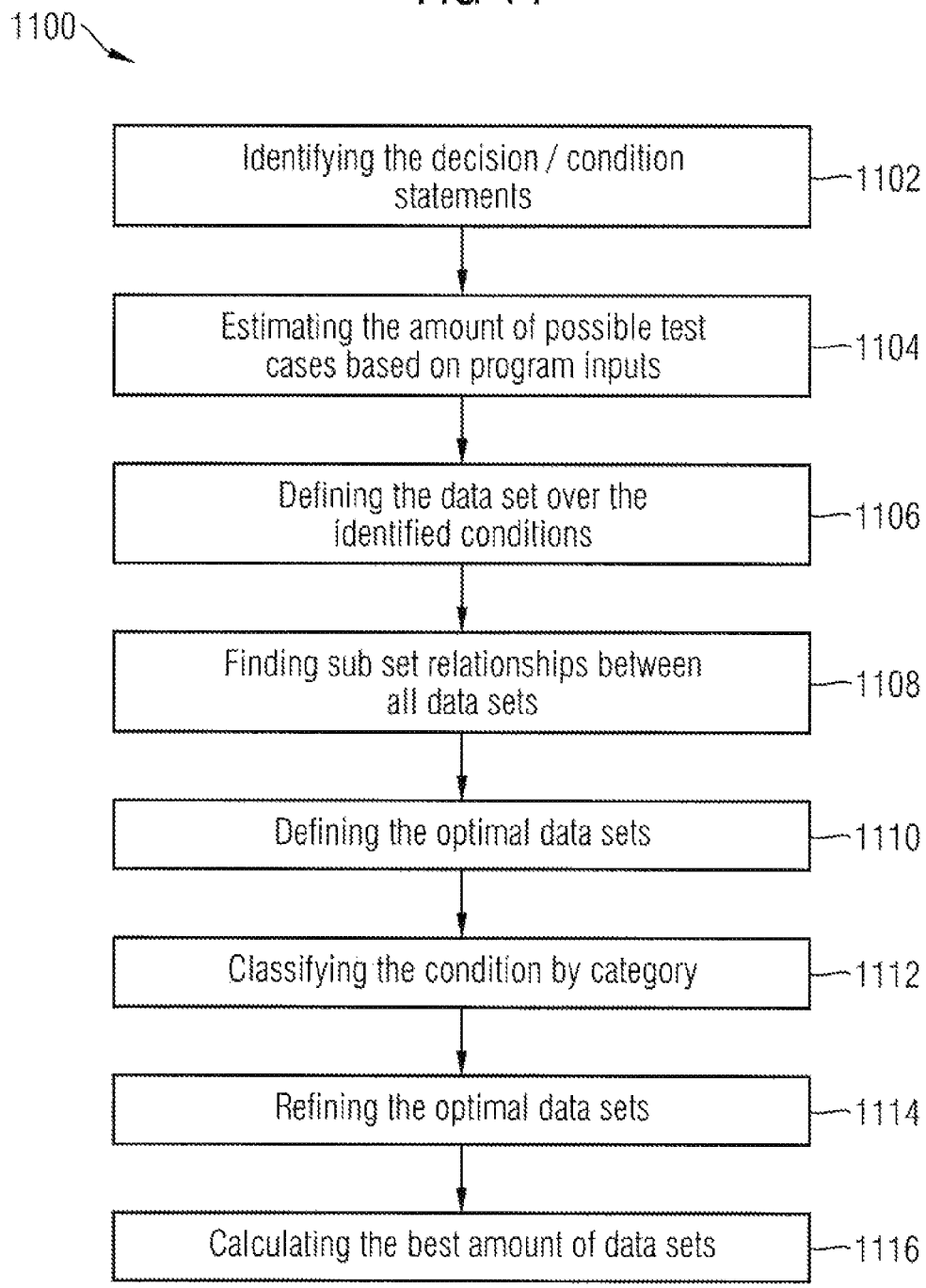

METHOD AND APPARATUS FOR THE PERFORMING UNIT TESTING OF SOFTWARE MODULES IN SOFTWARE SYSTEMS

CROSS-REFERENCE TO RELATED APPLICATIONS

This application claims priority to EP Patent Application No. 10004187 filed Apr. 20, 2010. The contents of which are incorporated herein by reference in its entirety.

TECHNICAL FIELD

The present invention relates generally to the field of software testing, and more particularly, the present invention relates to a method and apparatus for performing unit testing of software modules with use of a novel testing approach.

BACKGROUND

Due to increasing complexity of modern software systems, the likelihood of making errors during a software design phase has increased exponentially. While some of these errors might be detected during testing phase, it is much more cost effective to detect these errors early during design phase. For this reason, formal specification and analysis tools are increasingly being deployed to improve the quality of software design.

Among the various kinds of testing usually performed during the software development cycle, unit testing applies to the individual components of a software system. In principle, unit testing plays an important role in ensuring overall software quality since its role is precisely to detect errors in the component's logic, check all corner cases, and provide complete code coverage. Yet, in practice, unit testing is so hard and expensive to perform that it is rarely done properly. Indeed, in order to be able to execute and test a component in isolation, one needs to write test driver/harness code to simulate the environment of the component. More code is needed to test functional correctness, for instance using assertions checking the component's outputs. Since writing all of this testing code manually is expensive, unit testing is often either performed very poorly or skipped altogether. Moreover, subsequent phases of testing, such as feature, integration and system testing, are meant to test the overall correctness of the entire system viewed as a black-box, not to check the corner cases where bugs causing reliability issues are typically hidden. As a consequence, many software bugs that should have been caught during unit testing remain undetected until field deployment.

Successful software development and implementation requires various levels of software testing. In some instances, software testing involves a developer, tester, or other worker manually analyzing software code and manually generating test cases for each functional aspect of the software to be tested. In other instances, the unit testing is done partially automated partially manually or fully automated by a dedicated apparatus an testing software.

As referred to herein, a test case refers to the set of parameters necessary for unit testing the proper operation of a functional aspect in a reasonable percentage of possible scenarios. The developer, tester, or other worker must then write test code for each function to "unit test" the software. As used herein, unit testing refers to validating that a particular functional aspect for a particular unit of software operates properly under certain relatively predictable conditions. Because the test cases are designed to test the proper operation of a functional aspect in a reasonable percentage of predictable conditions, there may be scenarios that arise during further testing or post-implementation scenarios wherein the unit of software "regresses" (e.g., fails to perform properly wherein it previously performed properly). In these cases of regression, prior unit testing aids developers or other workers by establishing a threshold or baseline. This baseline indicates that the regression was caused by parameters outside the baseline. This knowledge focuses remedial efforts and additional testing of the software.

However, the development of test cases, test code, the running of unit tests, and the interpretation of unit tests is a time consuming process. In many cases, developers do not have the time or the motivation to properly perform all of these unit testing procedures. In some cases, this type of testing is passed on to testers. However, in some cases, testers are not as technically savvy regarding the software language in which the software code is written, and thus, are not always able to properly perform unit testing. Because of these and other challenges and problems to performing basic unit testing, it often goes undone or is performed incompletely or inadequately.

SUMMARY

Thus, to ensure at least a modicum of quality testing for a given unit of software code, while relieving the burden on developers, testers, and other workers, according to various embodiments, an automated unit testing open-platform framework can be provided that operates across multiple software languages. Further, since currently no standard exists for writing the test unit tests, according to various embodiments, the test writers can be provided with a methodology that eases the fulfillment of the coverage criteria by means of optimized test data, since unit testing is a data driven test. Further yet, according to various embodiments, software developers can be provided with a methodology that aids in choosing the right set of test data, to reduce the amount of test cases and fulfill the coverage of the code being tested.

According to an embodiment, a method of performing unit testing of a software module may comprise: reading, by a computer, target data and discovering of functional aspects of a piece of software code; dividing the target data into chunks; estimating a plurality of decision/condition statements of the software code; estimating an amount of possible test cases based on the program inputs; defining a data set over the plurality of identified decisions/conditions; finding subset relationships between all the defined data sets; defining a plurality of optimal data sets; classifying the condition of said plurality of optimal data sets by category; refining the plurality of optimal data sets, and calculating the best amount of data sets. According to another embodiment, the method may further comprise receiving programming code having a condition expressed therein. According to another embodiment, the method may further comprise transforming the code to be tested, either partially or integrally. According to another embodiment, the method may further comprise the step of: iteratively repeating steps of finding subset relationships between all the defined data sets; defining a plurality of optimal data sets; classifying the condition of said plurality of optimal data sets by category; refining the plurality of optimal data sets, and calculating the best amount of data sets of said method until a diminished amount of data sets is obtained that provides optimum test coverage. According to another embodiment, the method may further comprise generating a document that includes one or more identified classes, functions, parameter types, and parameters of said piece of software code to be unit tested. According to another embodiment, the document may comprise an XML document. According to another embodiment, the method may further comprise generating at least one report regarding the results of the one or more unit tests. According to another embodiment, the at least one report may include pass/fail information regarding at least one of the one or more unit tests. According to another embodiment, pass/fail information regarding at least one of the one or more unit tests further may include information regarding one or more of the identified functions. According to another embodiment, the method can be performed either manually or semi-automatically. According to another embodiment, an apparatus in communication with a computer readable recording medium, may comprise: a processor; and a memory, the processor coupled to the memory, the memory comprising therein a software program to be executed on said processor, the software program for performing unit testing of a software module, the software module comprising an external interface comprising one or more input variables having unknown values, a plurality of possible program execution paths which may result from an execution of said software module, each of said program execution paths comprising one or more outcomes of one or more of said conditional expressions comprised in said software module, the software program implementing the program steps of: reading target data and discovering of functional aspects of a piece of software code; dividing the target data into chunks; estimating a plurality of decision/condition statements of the software code; estimating an amount of possible test cases based on the program inputs; defining a data set over the plurality of identified decisions/conditions; finding subset relationships between all the defined data sets; defining a plurality of optimal data sets; classifying the condition of said plurality of optimal data sets by category; refining the plurality of optimal data sets, and calculating the best amount of data sets. According to a further embodiment of the apparatus, the apparatus may comprise at least one of a display, a user input interface, and a network interface. According to a further embodiment of the apparatus, said software module to be tested can be inputted to said processor via said user input interface. According to a further embodiment of the apparatus, said processor may run a unit testing application module comprising at least one of a parsing module, a unit testing module, a test case document generator, a report generating module. According to a further embodiment of the apparatus, the apparatus may interact with subject software, may produce test case documents, may report unit testing results, and/or may include other interaction or output. According to yet another embodiment, a computer-readable medium may have recorded thereon a software program to be executed on a computer, the computer readable medium being able to prompt a server in the computer network to perform unit testing of a software module, the software module comprising an external interface comprising one or more input variables having unknown values, a plurality of possible program execution paths which may result from an execution of said software module, each of said program execution paths comprising one or more outcomes of one or more of said conditional expressions comprised in said software module, the software program implementing the program steps of: reading target data and discovering of functional aspects of a piece of software code; dividing the target data into chunks; estimating a plurality of decision/condition statements of the software code; estimating an amount of possible test cases based on the program inputs; defining a data set over the plurality of identified decisions/conditions; finding subset relationships between all the defined data sets; defining a plurality of optimal data sets; classifying the condition of said plurality of optimal data sets by category; refining the plurality of optimal data sets, and calculating the best amount of data sets.

BRIEF DESCRIPTION OF THE DRAWINGS

The present invention will be understood more fully from the detailed description given below and from the accompanying drawings of various embodiments, which, however, should not be taken to limit the invention to the specific embodiments, but are for explanation and understanding only.

FIG. 11 is a flowchart comprising a high level representation of the method according to various embodiments.

DETAILED DESCRIPTION

Figure 1:
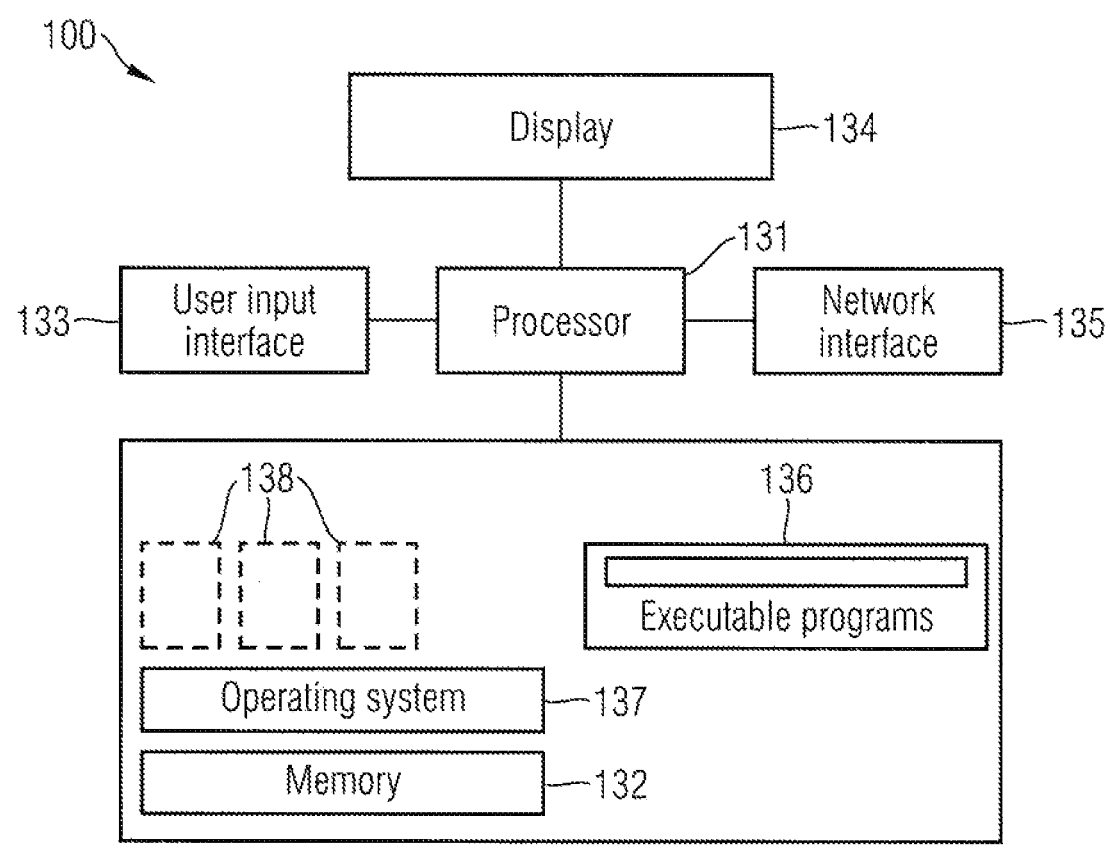
FIG. 1 illustrates an exemplary system having unit test generation capabilities, according to an embodiment.

According to various embodiments, a method of performing unit testing of a software module is proposed, comprising reading, by a computer or manually, target data and discovering of functional aspects of a piece of software code, dividing the target data into chunks, estimating a plurality of decision/condition statements of the software code, estimating an amount of possible test cases based on the program inputs, defining a data set over the plurality of identified decisions/conditions, finding subset relationships between all the defined data sets, defining a plurality of optimal data sets, classifying the condition of said plurality of optimal data sets by category, refining the plurality of optimal data sets, and calculating the best amount of data sets.

The method of method of performing unit testing of a software module may further comprise receiving programming code having a condition expressed therein. The method of performing unit testing of a software module may also further comprise transforming the code to be tested, either partially or integrally. Further, the method of performing unit testing of a software module may comprises iteratively repeating steps of finding subset relationships between all the defined data sets, defining a plurality of optimal data sets, classifying the condition of said plurality of optimal data sets by category, refining the plurality of optimal data sets, and calculating the best amount of data sets, until a diminished amount of data sets is obtained that provides optimum test coverage.

The method of performing unit testing of a software module may also further comprise generating a document that includes one or more identified classes, functions, parameter types, and parameters of said piece of software code to be unit tested. The document may comprises an XML document.

The method of performing unit testing of a software module may also comprise generating at least one report regarding the results of the one or more unit tests. The report includes pass/fail information regarding at least one of the one or more unit tests. The pass/fail information regarding at least one of the one or more unit tests further includes information regarding one or more of the identified functions.

The method of performing unit testing of a software module is performed either manually or semi-automatically.

According to other embodiments, an apparatus in communication with a computer readable recording medium is proposed, comprising a processor, and a memory, the processor coupled to the memory, the memory comprising therein a software program to be executed on said processor, the software program for performing unit testing of a software module, the software module comprising an external interface comprising one or more input variables having unknown values, a plurality of possible program execution paths which may result from an execution of said software module, each of said program execution paths comprising one or more outcomes of one or more of said conditional expressions comprised in said software module, the software program implementing the program steps of reading target data and discovering of functional aspects of a piece of software code, dividing the target data into chunks, estimating a plurality of decision/condition statements of the software code, estimating an amount of possible test cases based on the program inputs, defining a data set over the plurality of identified decisions/conditions, finding subset relationships between all the defined data sets, defining a plurality of optimal data sets, classifying the condition of said plurality of optimal data sets by category, refining the plurality of optimal data sets, and calculating the best amount of data sets.

The apparatus may further comprise at least one of a display, a user input interface, and a network interface. Further, in the apparatus the software module to be tested is inputted to said processor via said user input interface. It is the processor that runs a unit testing application module comprising at least one of a parsing module, a unit testing module, a test case document generator, a report generating module. The apparatus may interact with subject software, may produce test case documents, may report unit testing results, and/or may include other interaction or output.

According to further embodiments, is proposed a computer-readable medium having recorded thereon a software program to be executed on a computer, the computer readable medium being able to prompt a server in the computer network to perform unit testing of a software module, the software module comprising an external interface comprising one or more input variables having unknown values, a plurality of possible program execution paths which may result from an execution of said software module, each of said program execution paths comprising one or more outcomes of one or more of said conditional expressions comprised in said software module, the software program implementing the program steps of reading target data and discovering of functional aspects of a piece of software code, dividing the target data into chunks, estimating a plurality of decision/condition statements of the software code, estimating an amount of possible test cases based on the program inputs, defining a data set over the plurality of identified decisions/conditions, finding subset relationships between all the defined data sets, defining a plurality of optimal data sets, classifying the condition of said plurality of optimal data sets by category, refining the plurality of optimal data sets, and calculating the best amount of data sets.

These and other objects, features, and advantages will be apparent through the detailed description of the embodiments and the drawings attached hereto. It is also to be understood that both the foregoing summary and the following detailed description are exemplary and not restrictive of the scope of the invention.

The shortcomings of the prior art are overcome and additional advantages are provided through the provision of a method, a system, and computer program product for generating unit test scripts.

In computer programming by unit testing is understood a software verification and validation method in which a programmer tests if individual units of source code are fit for use. A unit is the smallest testable part of an application. In procedural programming, a unit may be an individual function or procedure. Ideally, each test case is independent from the others. Unit testing is considered to be a fundamental part of quality modern software development. The goal of unit testing is to isolate each part of a program and to show that the individual parts are correct. A unit test provides a strict written contract that the piece of code must satisfy. Mostly a unit test most satisfies the code coverage criteria, whether is a statement or branch, code coverage criteria. Currently no standard exists regarding writing of unit tests. The various embodiments aim to provide software developers with a new method that eases the fulfillment of the coverage criteria, by means of optimized test data since unit testing is a data-driven test. The method helps software developers to choose the right test data, to reduce the amount of test cases and to fulfill the coverage of the code being tested.

Up to now the problem was solved intuitively by each unit tester. The software developers tend to select the test data, just to make sure that the code is running and do not verify and validate the correctness. Further currently available tools are using a brute force approach to generate the test data or the amount of unit tests. Brute force approach is considered that a certain amount of test data provided by either a tester or a computer is available. The available test data is subject to optimization with the brute force. The brute force runs through the available data until the required coverage is reached. Unfortunately such an approach generates very large amounts of data is very time consuming and very costly. In contrast, the approach proposed by various embodiments relies on a mathematical data set theory that proposes a means of control of data flow and refinement of said data. The method and means of the various embodiments may be executed either manually or with the aid of automated means by the tester or software developer.

Referring now in detail to the figures in which like numerals represent the same or similar elements and initially to FIG. 1, an exemplary system having unit test generation capabilities, according to an embodiment.

System 100 may represent practically any type of computer, computer system or other programmable electronic system. System 100 may be connected to a network or may be a stand-alone system in the alternative.

System 100 includes a processor 131 that is connected to a memory unit 132, user input interface component 133 and display 134. System 100 can be connected to other devices via wired and/or wireless links. It is to be noted that system 100 can be characterized by a centralized architecture but that it can also be characterized by a distributed architecture. Accordingly, the various components of system 100 can be located near each other, but this is not necessarily so.

User input interface component 133 can be a keyboard, a mouse, a joystick, a touchpad, a microphone, a gesture recognition device, or a combination thereof. It is to be noted that, depending upon the embodiment, some of the above mentioned components may be optional.

The system 100 is as well provided with a network interface 135 that facilitates information exchange upon completion of a unit testing procedure. The processor 131 in conjunction with the memory 132 and the operating system 137, the processor 131 being coupled to the memory 132, the memory 132 comprising therein a software program 136 to be executed on said processor 131, facilitate that the software program performs unit testing of a software module, the software module comprising one or more input variables having unknown values, and a plurality of possible program execution paths which may result from an execution of said software module, each of the program execution paths comprising one or more outcomes of one or more of said conditional expressions comprised in said software module. The software program implementing the program performs a plurality of steps and protocols that will be described in detail in the subsequent portions of the present document.

Figure 2:
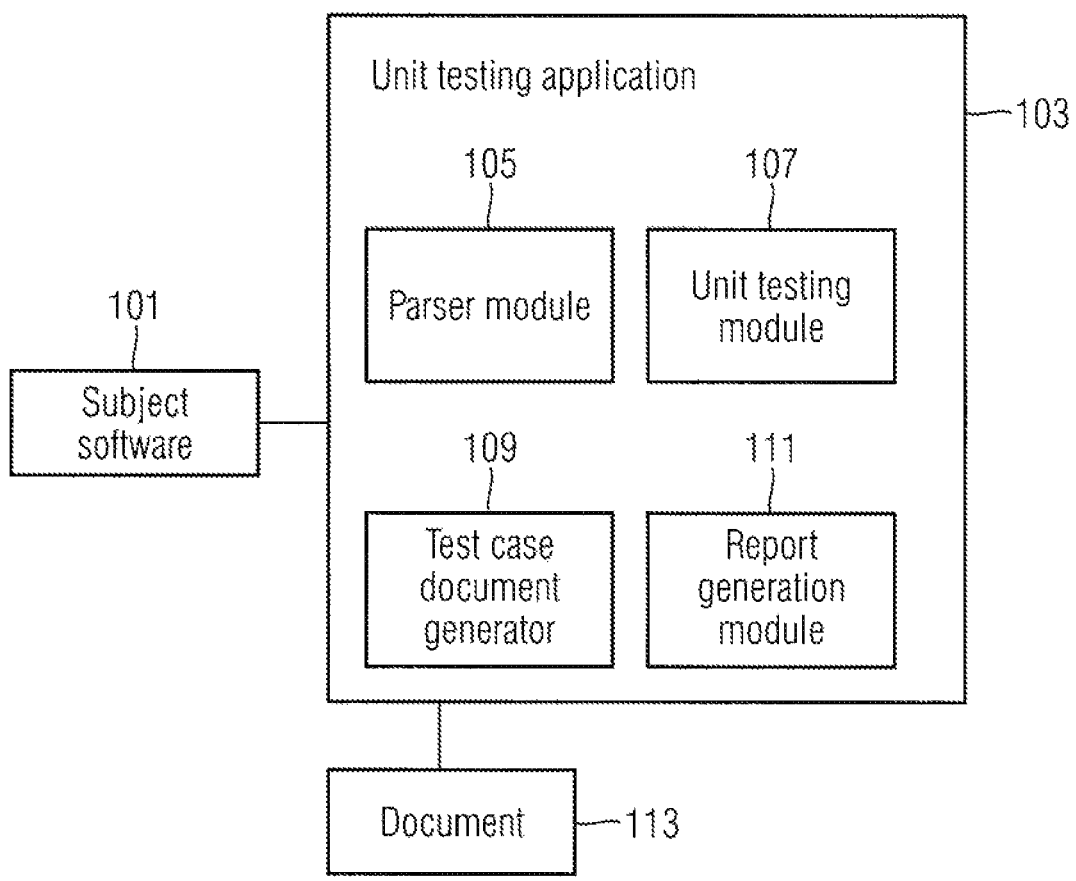
FIG. 2 illustrates an example of a system for unit testing, according to one embodiment.

FIG. 2 illustrates an example of a system for unit testing, according to one embodiment. In one embodiment, system 100 may include an unit testing application 103 and or other elements. System 100 may interact with subject software 101, may produce test case document 113, and/or may include other interaction or output.

In one embodiment, subject software 101 may comprise a portion of software code to be tested. Subject software 101 may comprise source code written in one of any number of available programming languages. In one embodiment, subject software 101 may be written in an object-oriented programming language such as, for example, Java. Other programming languages may be used. In some embodiments, subject software 101 may comprise object code (e.g., machine-readable code) and may take the form of, for example, an executable file.

In one embodiment, subject software 101 may include one or more "functional aspects." These functional aspects may comprise the general functional purposes that subject software 101 serves. For example, if subject software 101 is designed to print customer lists retrieved from a database, subject software 101 may include three functional aspects: 1) retrieval of data from the database, 2) formatting the data for printing, and 3) sending the formatted data to a printer. Other software may have other functional aspects. In some embodiments, some of these functional aspects may have "cross-cutting concerns." For example, even if the subject software is coded using an object-oriented programming language, the subject software may include one or more functional aspects (like logging/security, etc.) that affect other functional aspects.

In some embodiments, each of these functional aspects may be implemented in subject software 101 by one or more formal components of the software language in which subject software 101 is written. For example, if subject software 101 is coded using an object-oriented programming language, subject software 101 may include one or more classes, functions, methods, or other elements that are used to carry out each of its functional aspects.

In one embodiment, system 100 includes a unit testing application 103, which may comprise a computer application that is designed to perform the unit testing of subject software 101 and/or other software code. Unit testing application 103 may comprise and/or utilize one or more software modules for performing automated unit testing. In one embodiment, the one or more software modules may include a parsing module 105, a unit testing module 107, a test case document generator 109, a report generation module 111, and/or other modules.

In one embodiment, parsing module 105 may include a software module or other computer readable instructions that examines the code of subject software 101, identifies the functional aspects of the code, and identifies the corresponding formal components of those functional aspects. During conventional unit testing procedures, a developer, tester, or other personnel may have to manually examine the code of subject software 101 and identify the functional aspects and their corresponding formal components. The system according to various embodiments, may however automatically performs this step, which improves reliability, conserves personnel resources, and otherwise improves unit testing.

For example, in one embodiment, parsing module 105 may analyze the code of subject software 101 and may utilize predefined heuristics, rules, and/or a priori knowledge of how the programming language of subject software 101 is translated to functional results. This analysis enables parsing module 105 to automatically identify the functional aspects and corresponding formal components of subject software 101.

In one embodiment, the parsing module 105 may be able to identify the functional aspects and formal components of subject software 101 regardless of what programming language subject software is written in. In some embodiments, this "language independence" may be enabled by the predefined heuristics, rules, and/or a priori knowledge utilized by parsing module 105. This knowledge may include information (e.g., look up tables, etc.) that may enable parsing module 105 to identify functional aspects and formal components in some or all commonly used programming languages. In some embodiments, parsing module 105 may utilize coding conversions best practices, code annotations, or other characteristics that are common across all programming languages.

In some embodiments, parsing module 105 may not include the a priori knowledge necessary to parse the code of a particular piece of subject software 101 (e.g., parsing module 105 may not be able to recognize the functional aspects and formal components of the particular language in which subject software 101 is written). However, in these cases, a user (e.g., a developer, a tester, or other user) may provide such information, enabling parsing module 105 to continue.

In one embodiment, subject software 101 may be programmed in an object-oriented programming language. In these embodiments, the formal components identified by parsing module 105 may include classes, functions, methods, or other formal components that enable the functional aspects of an object-oriented subject software 101.

In one embodiment, in addition to identifying the formal components utilized by the functional aspects of subject software 101, parsing module 105 may also identify the parameter types that are utilized by the functional aspects of subject software 101. Parsing module 105 may identify these parameter types by examining the identified formal components (e.g., classes, functions, methods or other formal components) of subject software 101 to determine what types of parameters are taken as input and provided as output by subject software 101. The parser module identifies all the decision statements, such as the here statements, all the conditions, and obtains the number of atomic statements comprised in the subject software.

System 100 may also include a unit testing module 107. Unit testing module 107 may include a software module or other computer readable instructions that enable the generation of test parameters for subject software 101, the creation of test cases, the automatic generation of test code for unit testing subject software 101, the automated unit testing of subject software 101, and/or other features.

In one embodiment, unit testing module 107 may generate test parameters for testing the identified functional aspects of subject software 101. In one embodiment, unit testing module 107 may examine and utilize the formal components and parameter types identified for each of the functional aspects of subject software 101. For example, if the identified formal components include classes, functions, methods, or other components of object oriented code, unit testing module 107 may determine a set of test parameters for these classes, functions, methods, or other components, based on the identified parameter types for these formal components. In one embodiment, the generated test parameters may be used to test the proper operation of the functional aspects of subject software 101 in a reasonable set of possible circumstances.

In one embodiment, unit testing module 107 may store the generated test parameters and the identified formal components for one or more identified functional aspects as a "test case" for the one or more functional aspects. In some embodiments, a test case may refer to the identified formal components and generated test parameters for a single identified functional aspect of subject software 201 (e.g., the number of identified functional aspects for subject software equals the number of test cases). In other embodiments, a single test case may include the identified formal components and generated test parameters for more than one functional aspect of subject software 101.

In one embodiment, unit test module 107 may generate test code for unit testing each of the stored test cases. The test code may comprise software code that executes the functional aspects of subject software 101 using the generated test parameters. Unit test module 107 may utilize the identified formal components and the generated test parameters for each functional aspect of a test case to generate the test code for the test case. In one embodiment, document 113 generated by test case document generator 109 may be used to generate the test code and/or execute the unit tests for each test case. If, for example, document 113 is an XML document, unit test module 107 may utilize an XML parser and serializer to parse document 113 and generate the test code.

In one embodiment, unit testing module 107 may perform unit testing. In one embodiment, the unit testing may be performed by executing the test code for each test case. Executing the test code essentially executes the identified functional aspects of subject software 101 using the test parameters. In one embodiment, the original code of subject software 101 that is responsible for the tested functional aspects may be incorporated into the test code and executed by the test code. In another embodiment, the executed test code may call the portions of the original code of subject software 101 that are responsible for the tested function.

In one embodiment, the test code is software code written in a specific software language that, when executed, executes the functions of the software to be tested. The test code executes these functions using the generated test parameters to determine whether the functions perform properly.

Upon execution of the test code, a pass or fail result will be generated for each identified functional aspect of subject software 101. For example, if a particular functional aspect performed properly under all of the generated parameters, then that functional aspect receives a "pass" rating. If the functional aspect did not perform properly under some or all of the generated test parameters, then it receives a "fail" rating.

In one embodiment, the unit testing module performs a process that allows the unit test coverage to be maximized. To this end, the parser module identifies all the decision statements, such as the here statements, all the conditions, and obtains the number of atomic statements comprised in the subject software. The parser unit may as well classify the conditions by category into sequential conditions, nested conditions, sequential combination conditions and nested combination conditions. The unit test module calculates or estimates the amount of possible test cases or test data based on the program inputs and assigns it a denomination, such as G. G represents the worst case since the amount of data found in very large. Subsequently, data sets are identified based on the conditions identified above. For each condition at least 2 data sets are defined, such as pertaining to the set characterized as true and pertaining to the set characterized as false. By means of a dedicated sub-module the unit testing module finds the subset-relationship between all data sets by means of a predefined relationship table or predefined mathematical notation. Based on said relationships between all the data sets all the data sets are defined. As it will be discussed in detail in connection with specific examples of test software, if compared to the universe of possible test data G defined above, the amount of test cases is reduced versus the amount of data set. By using only one element of each data set, the 100% coverage will be reached by means of the average case. The average case may be refined to become the best case by using pre-defined rules. The average case may be refined by calculating the best amount of data sets by overlapping conditions and subsequently counting the amount of branches. The above stated process for minimizing the unit test coverage will be described in detail in the present document in connection with concrete examples.

In one embodiment, system 100 includes a test case document generator 109. In one embodiment, test case document generator 109 includes a software module or other set of computer readable instructions that generates a computer readable document 113 for each test case. In one embodiment document 113 generated for each test case may include some or all of the identified formal components and generated test parameters for the corresponding functional aspects of the test case. Document 113 may be utilized to test the functional aspects of subject software 101. In one embodiment, document 113 may comprise an XML document. Other formats may be used.

In one embodiment, the individual formal components of a functional aspect of subject software 101 (e.g., the functions or methods that comprise each functional aspect) may each receive their own pass/fail rating that are used to determine the pass/fail rating of the functional aspect. For example, if a functional aspect of subject software 101 included multiple functions or methods, and one or more of the functions or methods received fail ratings, then the functional aspect of the software may receive a fail rating. If all of the functions or methods received pass ratings, then the functional aspect of the software would receive a pass rating.

If each test case includes only one functional aspect of subject software 101, then the pass/fail rating of the functional aspect is the pass/fail rating of the test case. However, if a test case includes one or more functional aspects of subject software 101, then a closer examination of the pass/fail ratings of the functional aspects is necessary to determine the pass/fail rating of the test case. For example, if one or more of the functional aspects of the test case receives a fail rating, then the test case may receive a fail rating. If all of the functional aspects of a test case receive a pass rating, the test case may receive a pass rating.

In one embodiment, unit testing application 103 includes a reporting module 111. In one embodiment, reporting module 111 may generate and send one or more reports regarding the results of unit testing to one or more destinations, including, for example, one or more users, one or more computer or computer networks, one or more printers, or other destinations. In some embodiments, the reports generated by reporting module may include details of the identified functional aspects of subject software 101, the identified formal components of subject software 101, the generated test parameters, the test case breakdowns, the pass/fail results, and/or other information. In one embodiment, the reports generated by reporting module 111 may be sent via email, may be sent to a printer, or may otherwise be provided to a user or computer system.

The subject software comprises a plurality of units to be tested. The unit is defined as the smallest testable pat of a software application. As the goal of unit testing is to isolate each part of the program and to show that the individual parts are correct, the subject software is first subjected for example by the parser module to parsing in order to separate the units to be tested. A unit test provides a strict, written contract that the piece of code must satisfy. Essentially the unit test should satisfy the code coverage criteria, as such is it of outmost importance that the code to be tested is correctly parsed in all its component statement and branch components.

Figure 3:
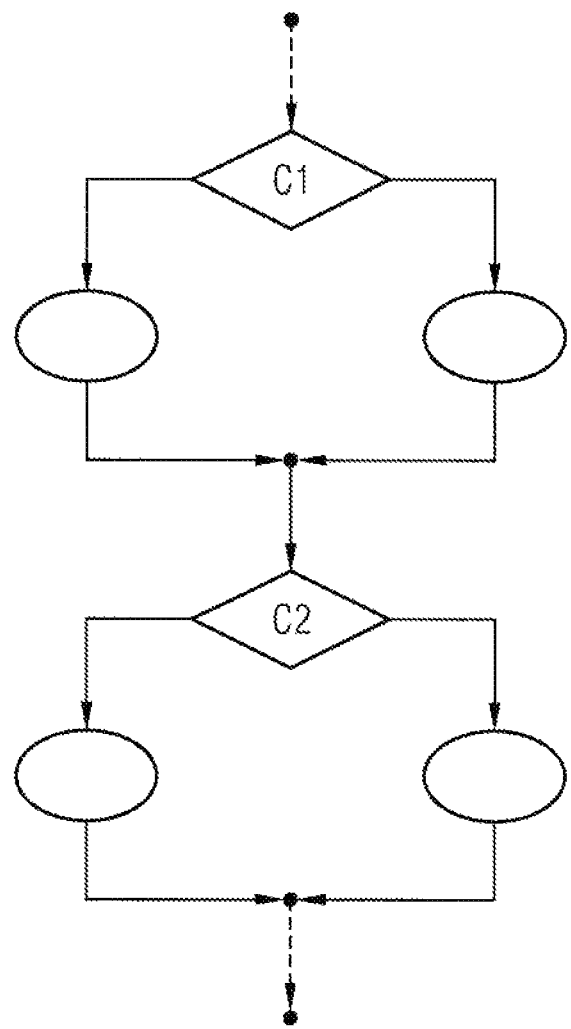
FIG. 3 illustrates a sequential condition of a software code.
Figure 4:
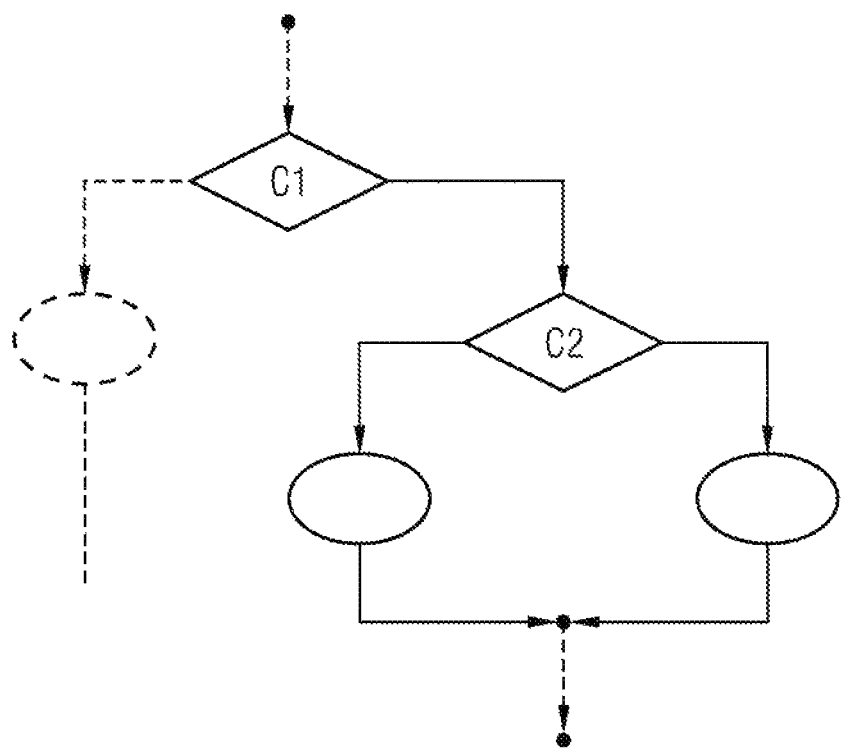
FIG. 4 illustrates a nested condition of a software code.

Code to be tested may comprise sequential conditions, as illustrated for example in FIG. 3. As represented the sequential conditions comprises 2 conditions and 4 branches. Assuming that A and B are two data sets over condition C1, and C and D two data sets over condition C2, with A being the set of true-value, right condition, B being the set of false values, left to the condition, C being the set of true value and D being the set of false values. In order to provide complete coverage of all the data sets via brute force a set of at least 8 data sets in necessary for complete data coverage. In order to maximize the coverage of the data sets, with less effort over the sequential conditions, the chosen test data should respect in accordance with various embodiments the following assertions:

$X \in \{X_1, X_2\}$ with
$X_1 \in A \cap C$
$X_2 \in B \cap D$,
or
$X \in \{X_1, X_2\}$ with
$X_1 \in A \cap D$
$X_2 \in B \cap C$ Code to be tested may comprise nested conditions, as illustrated for example in FIG. 4. As represented the nested conditions comprises 2 conditions and 3 branches. Assuming that A and B are two data sets over condition C1, and C and D two data sets over condition C2, with A being the set of true-value, right condition, B being the set of false values, left to the condition, C being the set of true value and D being the set of false values. In order to provide complete coverage of all the data sets via brute force a set of at least . . . data sets in necessary for complete data coverage. In order to maximize the coverage of the data sets, with less effort over the nested conditions, the chosen test data should respect in accordance with various embodiments the following assertions:

$X \in \{X_1, X_2, X_3\}$ with $X_1 \in B, X_2 \in C, X_3 \in D$

Figure 5:
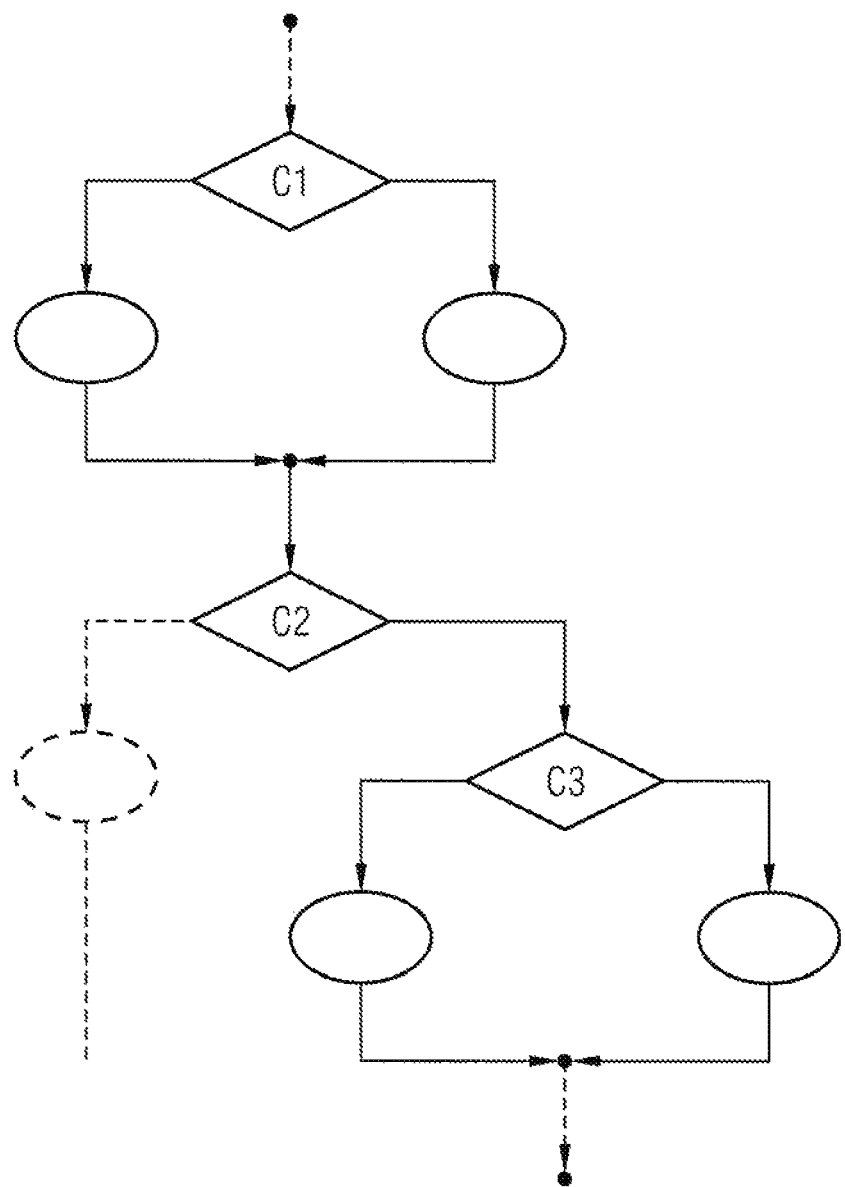
FIG. 5 illustrates a sequential combination in a software code.
Figure 6:
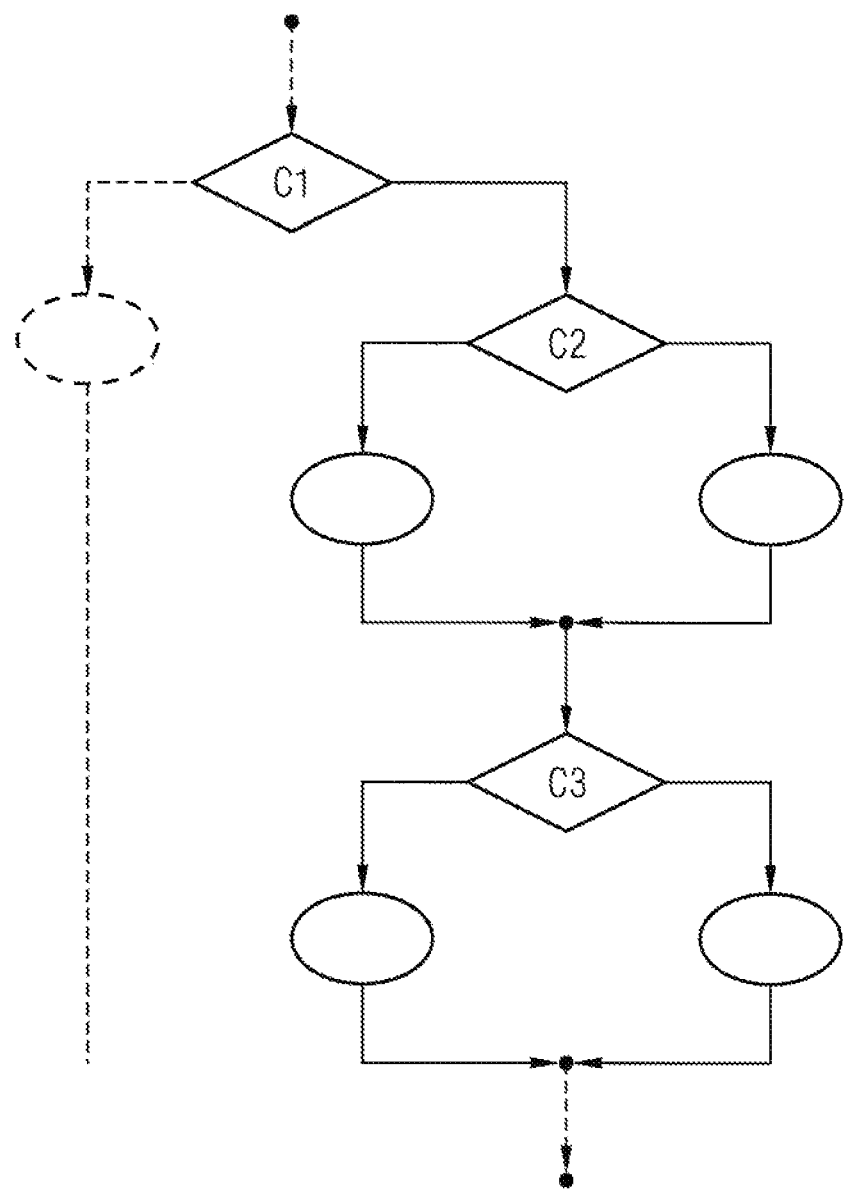
FIG. 6 illustrates a nested combination in a software code.

Code to be tested may comprise a combination of sequential and nested conditions, as illustrated for example in FIGS. 5 and 6. In order to provide for complete coverage test data there needs to be an overlap between good coverage of both sequential and nested conditions.

In the sequential combination illustrated in FIG. 5, it is assumed that A and B are two data sets over the condition C1, with A being the set of true-value and B the set of false values. C and D are two data sets over the condition C2, with C being the set of true-value and D being the set of false values. E and F are the two sets over the condition C3, with E being the set of true-value and F the set of false-values. In order to maximize unit test coverage with less effort over the sequential combination, the chosen test data should respect the following assertion:

$X \in \{X_1, X_2, X_3\}$ with
$X_1 \in B \cap D, X_2 \in A \cap E, X_3 \in A \cap F$
or
$X \in \{X_1, X_2, X_3\}$ with
$X_1 \in A \cap D, X_2 \in B \cap E, X_3 \in B \cap F$ In the nested combination illustrated in FIG. 6, it is assumed that A and B are two data sets over the condition C1, with A being the set of true-value, B being the set of false values. C and D are the data sets over the condition C2, with C being the set of true-value and D being the set of false values. E and F are two sets over the condition C3, with E being the true value set and F the set of false values. In order to maximize the coverage with less effort over the nested conditions, the chosen test data should respect the following assertion:

$X \in \{X_1, X_2, X_3\}$ with
$X_1 \in B, X_2 \in C \cap E, X_3 \in D \cap F$
or
$X \in \{X_1, X_2, X_3\}$ with
$X_1 \in B, X_2 \in C \cap F, X_3 \in D \cap E$ An exemplary source software to be unit tested may follow the following code:

```
//Program start
Statement s1;
Statement s2;
while (condition c1) {
    Statement s3;
    if (condition c2) {
        Statement s4;
    }
    else {
        Statement s5;
        Statement s6;
    }
    Statement s7;
    if (condition c3) {
        Statement s8;
        Statement s9;
    }
    else {
        Statement s10;
            if (condition c4) {
                Statement s11;
                Statement s12;
            }
            else {
                Statement s13;
                Statement s14;
            }
    }
    Statement s15;
}
Statement 16;
if (condition c5) {
    Statement s17;
}
else {
    Statement s18;
    Statement s19;
}
Statement s20;
//Program end
```

The exemplary source software to be unit tested may be for example:

```
//input int a,b∈ [0, 19]
print "1,"; --(s1)
print "2,"; --(s2)
while (a<b) {--(c1)
    print "3,"; --(s3)
    if (mod(b,2) =0) {--(c2)
        print "4,"; --(s4)
    }
    else {
        print "5,"; --(s5)
        print "6,"; --(s6)
    }
    print "7"; --(s7)
    if (mod(a,3) =0) {--(c3)
        print "8,"; --(s8)
        print "9,"; --(s9)
    }
    else {
        print "10,"; -- (s10)
        if (prime(b) ) {--(c4)
            print "11,"; --(s11)
            print "12,"; --(s12)
        }
        else {
            print "13,"; --(s13)
            print "14,"; --(s14)
        }
    }
    a++; --(s15)
}
print "15,"; --(s16)
if (b=3a) {--(c5)
    print "16,"; --(s17)
}
else {
    print "17,"; --(s18)
    print "18,"; --(s19)
}
print "19"; --(s20)
//Program end
```

Figure 7:
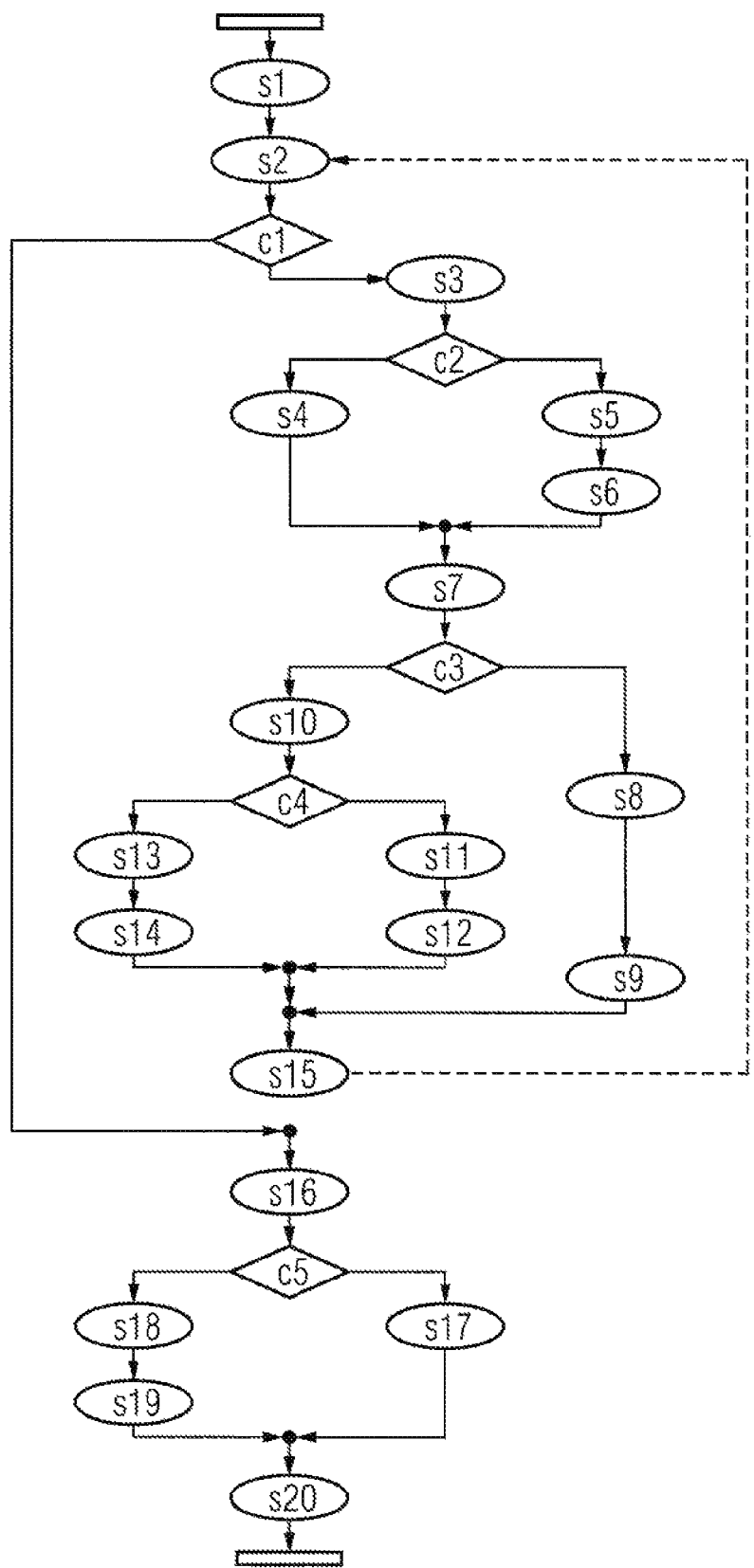
FIG. 7 is a graphical representation of an exemplary source code.

A graphical representation of said exemplary source code may be seen in FIG. 7. As it may be observed from the figure, the source code represented in FIG. 7 is a combination of sequential and nested data structures. In the following it will be illustrated how to write the a test routine for the code represented in FIG. 7 in accordance with the methodology proposed by various embodiments, while optimal code coverage is achieved and the minimal and optimal amount of unit test cases is used to cover the code shown in FIG. 7. It is assumed that S is a set of tuples (a, b), with a,b $\in [0, 19]$ needed to fulfill the code coverage.

Should the tester wish to proceed to white a test routine for the code illustrated in FIG. 7 using brute force, the set of tuples in this case would be $$S=\{(a,b) \text{with}(a,b) \in [0,19] \times [0,19]\}$$

therefore the number of tuples #S=20×20=400.

Therefore, should the tester wish to aim at complete test coverage for the code illustrated in FIG. 7 and should elect to proceed by brute force, a number of 400 test units would be necessary to be written to cover all possible combinations.

As it will be shown in the following should the tester wish to proceed in accordance with the method of various embodiments, a number of only 5 test units would need to be written to provide the same test coverage, without sacrificing test accuracy.

The tester should proceed by manually or automatically via a parser unit identify all the decision statements, or conditions present in the code, and obtain the number of atomic statements. For the example of FIG. 7 there are features 20 statements and 5 conditions.

$$c_1 = a < b$$

$$c_2 = \text{mod}(b,2) = 0$$

$$c_3 = \text{mod}(a,3) = 0$$

$$c_4 = \text{prime}(b), \text{and}$$

$$c_5 = b > 3a$$

Further, the tester should calculate or estimate the amount of possible test cases or test data based on the program inputs and name it G, representing the worst case. For the example code of FIG. 7

$$G=\{(a,b)\text{with}(a,b) \in [0,19] \times [0,19]\}$$

the calculated value of G is usually a very large value. For the exemplary code G is equal to 400.

Further yet, the tester should proceed with defining all the data sets based over the conditions identified above. For each condition 2 data sets are defined.

A data set over conditions is defined as illustrated in the table bellow, where the conditions are associated their true or false correspondent.

|    | True | False |
|----|------|-------|
| C1 | A    | B     |
| C2 | C    | D     |
| C3 | E    | F     |
| C4 | G    | H     |
| C5 | I    | J     |

In the table above, if "$C_n$" is a condition, A is the set of values for which the condition $C_n$ is true and B the set of false values. A and B are sets over the condition C.

$$C(A)=\text{True}$$

$$C(B)=\text{False, with } A \cap B = \emptyset$$

Specifically for the exemplary software code provided above, the table comprising the data set over conditions is:

|              | True | False |
|--------------|------|-------|
| a < b        | A    | B     |
| mod(b, 2) = 0 | C    | D     |
| mod(a, 3) = 0 | E    | H     |
| prime(b)     | G    | F     |
| b = 3a       | I    | J     |

The tester, proceeding in accordance with the method of various embodiments, proceeds to find the subset relationships between all data sets by means of a relationship table or mathematical notation.

An exemplary table with relationships over the data set may be seen bellow:

|   | A | B | C | D | E | F | G | H | I | J |
|---|---|---|---|---|---|---|---|---|---|---|
| A | — | 0 | 1 | 1 | 1 | 1 | 1 | 1 | 0 | 0 |
| B |   | — | 0 | 0 | 0 | 0 | 0 | 0 | 1 | 1 |
| C |   |   | — | 0 | 0 | 0 | 0 | 0 |   |   |
| D |   |   |   | — | 0 | 0 | 0 | 0 | 0 | 0 |
| E |   |   |   |   | — | 0 | 1 | 1 | 0 | 0 |

-continued

|   | A | B | C | D | E | F | G | H | I | J |
|---|---|---|---|---|---|---|---|---|---|---|
| F |   |   |   |   |   | — | 0 | 0 | 0 | 0 |
| G |   |   |   |   |   |   | — | 0 | 0 | 0 |
| H |   |   |   |   |   |   |   | — | 0 | 0 |
| I |   |   |   |   |   |   |   |   | — | 0 |
| J |   |   |   |   |   |   |   |   |   | — |

A set A is in relationship with a set B of B is a subset of A or if it B equals A.

The following relationships are derived from the table above:

$C \subseteq A; D \subseteq A; E \subseteq A; F \subseteq A; G \subseteq A; H \subseteq A;$  1.

$I \subseteq B; J \subseteq B;$  2.

$G \subseteq E; H \subseteq E;$  3.

For the exemplary code represented in FIG. 7 the relationships between data set are as follows:

$A \subseteq G; B \subseteq G$ $C \subseteq A; D \subseteq A; E \subseteq A; F \subseteq A; G \subseteq A; H \subseteq A;$ $I \subseteq B; J \subseteq B;$ $G \subseteq E; H \subseteq E;$ After having all the data relationships, a graphical or logical representation may be as well be made. Said representation assists the tester at writing manually the testing methodology for the code.

Figure 8:
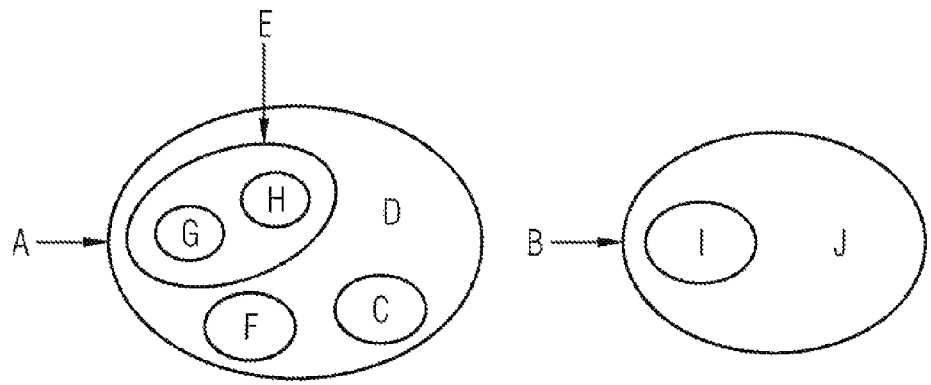
FIGS. 8 to 10 are graphical representation of data sets.
Figure 9:
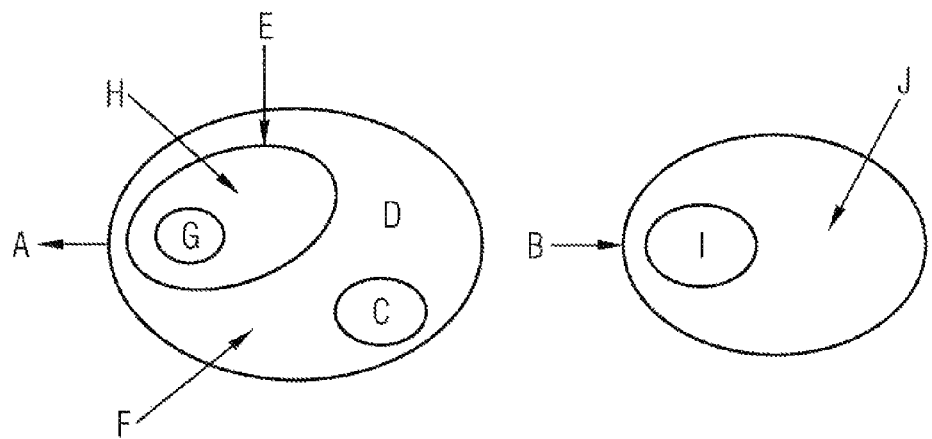
Figure 10:
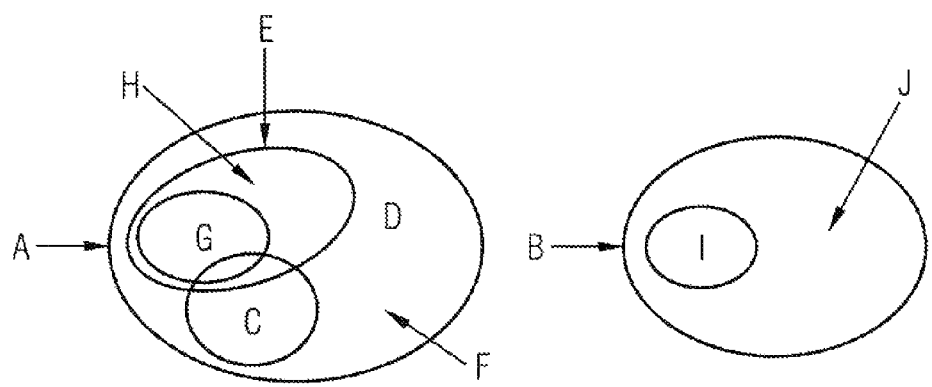

An exemplary representation is provided in FIGS. 8 to 10. FIG. 8 is a graphical representation of relationships between data sets that respect the relationship derived from the table above.

The data set may be further refined and should $J=B-I; H=E-G; F=A-(C \cup D \cup E)$ the representation made in FIG. 9.

Further data refinement steps are possible by looking at what elements the data parts have in common. It may be noted in FIG. 9 that C and D share data with E and F. Therefore, data may be further refined as illustrated in FIG. 10 and is noted that as a result of the further refinement only 5 data sets are necessary for a complete representation of the code instead of the 10 derived above.

Subsequently, the tester needs to define all data sets, using the data set over conditions:

Therefore, for the exemplary code of FIG. 7 the optimal case, using the data set over conditions, is:

$A=\{(a,b) \text{ with } a \in [0,9], b \in [10,19]\}$ $B=\{(a,b) \text{ with } a \in [10,19], b \in [0,9]\}$ $C=\{(a,b) \text{ with } a \in [0,9], b \in \{10,1214,16,18\}\}$ $D=\{(a,b) \text{ with } a \in [0,9], b \in \{11,13,15,17,19\}\}$ $E=\{(a,b) \text{ with } a \in \{0,3,6,9\}, b \in [10,19]\}$ $F=\{(a,b) \text{ with } a \in \{1,2,4,5,7,8\}, b \in [10,19]\}$ $G=\{(a,b) \text{ with } a \in \{0,3,6,9\}, b \in \{11,13,17,19\}\}$ $H=\{(a,b) \text{ with } a \in \{0,3,6,9\}, b \in \{10,12,14,15,16,18\}\}$ $I=\{(a,b) \text{ with } a \in \{0,1,2,3,4,5,6\}, b=3a\}$ $J=\{(a,b) \text{ with } a \in [0,19], b \neq 3a\}$ $S=\{x_1,x_2,x_3,x_4,x_5,x_6,x_7,x_8,x_9,x_{10} \text{ with } x_1 \in A, x_2 \in B, x_3 \in C, x_4 \in D, x_5 \in E, x_6 \in F, x_7 \in G, x_8 \in H, \} \{x_9 \in I, x_{10} \in J\}$ The number of test units S=10.

Compared to the universe of possible test data G, the amount of test cases is reduced by the amount of data sets. By using only one element of each data set, the 100% test coverage will be reached. This number represents the average case and may be further refined.

The tester may further proceed to classify the conditions of the exemplary code by category. As discussed above, the exemplary code may comprise sequential conditions. In the exemplary code of FIG. 7, the conditions c1 and c2 are sequential if the parent condition (c1)=parent condition (c2). The parent condition may as well be null.

The exemplary code may comprise nested conditions. In the exemplary code of FIG. 7, the condition c1 is nested to c2 if the c1=patent condition (c2), and c2 in not null.

The exemplary code may also comprise sequential combinations and nested combinations. The sequential combination c1, c2, c3 are sequentially combined if c3 is nested to c2 and c2 is sequential to c1. c1, c2, and c3 are nested combined if c3 is sequential to c2 and c3, and c2, and c3 are both nested to c1. For the example illustrated in FIG. 7 c1 is sequential to c5, c3 is sequential to c2, c2 and c3 are nested to c1, and as such c1,c2, and c3 build a nested combination. Also, since c4 is nested to c3, c2, c3, c4 build a sequential combination.

The average case may be further refined to become the best case by using the following rules: the tester may calculate the best amount of data set by overlapping the conditions, then counting the amount of branches. For the exemplary code c2 could be overlapped with c1 is the patent condition c1 is equal with the patent condition c2 and c1 fully leads to c2. Further, c2 may be overlapped with c3 and the result is 3 test cases. C5 cannot be overlapped and the result is 2 test cases. Therefore, 5 test cases is the test data that fulfils the best test coverage.

In accordance with the above, the tester may further yet proceed with refining the data set to maximize the test coverage, by overlapping c2 with c3

$\rightarrow C \cap F, D \cap E \text{ or } C \cap E, D \cap F$

The nested condition c4

$\rightarrow E=G \subset H \rightarrow C \cap F, D \cap G, D \cap H \text{ or } C \cap G, C \cap H, D \cap F$ The condition c5 → I,J Particularly for the exemplary code of FIG. 7

$S=\{x_1,x_2,x_3,x_4,x_5\}$ with $Block01=[x_1 \in I; x_2 \in J; x_3 \in C \cap H, x_4 \in C \cap G, x_5 \in D \cap F]$ Or $Block02=[x_1 \in I; x_2 \in J; x_3 \in D \cap H, x_4 \in D \cap G, x_5 \in C \cap F]$ For example S={(1,3), (1,2), (3,15), (3, 11), (2,12)} if ∈Block02.

As it may be observed from the above, the tester has a possible 400 test units that provided best coverage of the code illustrated in FIG. 7, and by practicing the method proposed by the various embodiments, the number has been reduced by a factor of 80, to a number of 5 test units necessary to be written or automatically generated in order to provide optimal test coverage for said code.

Of course, writing 5 or 10 unit test cases is cheaper than writing 400 unit test cases. Should the scale of the software code match the scale used in platform engineering found in the industry sector, the scale is equivalent with 10 000 units of test cases. If unit test reduction is achieved by a factor of 10 is already the equivalent to saving of 90% of the costs invested in testing. But as show in connection with the example made above, reductions may be achieved up to a factor of 80.

To summarize, the method of performing unit testing of a software module, irrespective that is executed manually or in an automated way comprises at least the following steps reading, by a computer or manually, target data and discovering of functional aspects of a piece of software code, dividing the target data into chunks, estimating a plurality of decision/condition statements of the software code, estimating an amount of possible test cases based on the program inputs, defining a data set over the plurality of identified decisions/conditions, finding subset relationships between all the defined data sets, defining a plurality of optimal data sets, classifying the condition of said plurality of optimal data sets by category, refining the plurality of optimal data sets, and calculating the best amount of data sets. The method of method of performing unit testing of a software module may further comprise receiving programming code having a condition expressed therein. The method of performing unit testing of a software module may also further comprise transforming the code to be tested, either partially or integrally. Further, the method of performing unit testing of a software module may comprises iteratively repeating steps of finding subset relationships between all the defined data sets, defining a plurality of optimal data sets, classifying the condition of said plurality of optimal data sets by category, refining the plurality of optimal data sets, and calculating the best amount of data sets, until a diminished amount of data sets is obtained that provides optimum test coverage. The method of performing unit testing of a software module may also further comprise generating a document that includes one or more identified classes, functions, parameter types, and parameters of said piece of software code to be unit tested. The document may comprises an XML document. The method of performing unit testing of a software module may also comprise generating at least one report regarding the results of the one or more unit tests. The report includes pass/fail information regarding at least one of the one or more unit tests. The pass/fail information regarding at least one of the one or more unit tests further includes information regarding one or more of the identified functions. The method of performing unit testing of a software module is performed either manually or semi-automatically.

Those having skill in the art will appreciate that the invention described herein may work with various configurations. Accordingly, more or less of the aforementioned system components may be used and/or combined in various embodiments. Additionally, more or less of the aforementioned operations may be performed and/or various operation may be performed in varying order. It should also be understood that the various software modules discussed herein and unit testing application that are utilized to accomplish the functionalities described herein may be maintained and or executed on one or more special purpose or general purpose computers and/or processors cable of responding to and executing instructions in a defined manner as necessary. In some embodiments, as would be appreciated, the functionalities described herein may be implemented in various combinations of hardware and/or firmware, in addition to, or instead of, software.

While the invention has been described with reference to the certain illustrated embodiments, the words that have been used herein are words of description, rather than words of limitation. Changes may be made, within the purview of the associated claims, without departing from the scope and spirit of the invention in its aspects. Although the invention has been described herein with reference to particular structures, acts, and materials, the invention is not to be limited to the particulars disclosed, but rather can be embodied in a wide variety of forms, some of which may be quite different from those of the disclosed embodiments, and extends to all equivalent structures, acts, and, materials, such as are within the scope of the associated claims.

What is claimed is:

1. A method of performing unit testing of a software module, comprising:
    identifying, by a computer, functional aspects of a piece of software code;
    identifying a plurality of decision/condition statements of the piece of software code;
    estimating an amount of possible test cases based on the plurality of identified decision/condition statements;
    defining a data set over the plurality of identified decision/condition statements;
    finding subset relationships between all the defined data sets;
    defining a plurality of optimal data sets, the defining a plurality of optimal data sets including defining at least two data sets for each of said identified decision/condition statements, a first data set characterized as true and a second data set characterized as false;
    classifying each decision/condition statement into one of a plurality of decision/condition categories including at least a sequential decision/condition category and a nested decision/condition category;
    refining the plurality of optimal data sets by overlapping at least a subset of the plurality of decision/condition statements based on the decision/condition category classifications of the decision/condition statements, and
    calculating a reduced amount of data sets as compared with the plurality of optimal data sets based on the refined optical data sets, the reduced amount comprising an amount that provides optimal coverage with a minimal number of test cases.

2. The method according to claim 1, further comprising receiving programming code having a condition expressed therein.

3. The method according to claim 1, further comprising transforming the code to be tested, either partially or integrally.

4. The method according to claim 1, further comprising iteratively repeating steps of:
    finding subset relationships between all the defined data sets;
    defining a plurality of optimal data sets;
    classifying each decision/condition statement into one of the plurality of decision/condition categories;
    refining the plurality of optimal data sets, and
    calculating the reduced amount of data sets of said method until a diminished amount of data sets is obtained that provides optimum test coverage.

5. The method according to claim 1, further comprises generating a document that includes one or more identified classes, functions, parameter types, and parameters of said piece of software code to be unit tested.

6. The method according to claim 5, wherein the document comprises an XML document.

7. The method according to claim 1, further comprising generating at least one report regarding the results of the one or more unit tests.

8. The method according to claim 7, wherein the at least one report includes pass/fail information regarding at least one of the one or more unit tests.

9. The method according to claim 8, wherein pass/fail information regarding at least one of the one or more unit tests further includes information regarding one or more of the identified functions.

10. The method according to claim 1, wherein the method is performed either manually or semi-automatically.

11. An apparatus in communication with a computer readable recording medium, comprising:
   a processor;
   and a memory,
   the processor coupled to the memory,
   the memory comprising therein a software program to be executed on said processor,
   the software program for performing unit testing of a software module,
   the software module comprising an external interface comprising one or more input variables having unknown values,
   a plurality of possible program execution paths which may result from an execution of said software module,
   each of said program execution paths comprising one or more outcomes of one or more of said conditional expressions comprised in said software module,
   the software program implementing program steps of:
      identifying functional aspects of a piece of software code;
      identifying a plurality of decision/condition statements of the piece of software code;
      estimating an amount of possible test cases based on the plurality of identified decision/condition statements;
      defining a data set over the plurality of identified decision/condition statements;
      defining data sets over the plurality of decision/condition statements, the defining data sets including defining at least two data sets for each of said identified decision/condition statements, a first data set characterized as true and a second data set characterized as false;
      finding subset relationships between all the defined data sets;
      defining a plurality of optimal data sets;
      classifying each decision/condition statement into one of a plurality of decision/condition categories including at least a sequential decision/condition category and a nested decision/condition category;
      refining the plurality of optimal data sets by overlapping, at least a subset of the plurality of decision/condition statements based on the decision/condition category classifications of the decision/condition statements, and
      calculating a reduced amount of data sets as compared with the plurality of optimal data sets based on the refined optical data sets, the reduced amount comprising an amount that provides optimal coverage with a minimal number of test cases.

12. The apparatus according to claim 11, further comprising at least one of a display, a user input interface, and a network interface.

13. The apparatus according to claim 11, wherein said software module to be tested is inputted to said processor via said user input interface.

14. The apparatus according to claim 11, wherein said processor runs a unit testing application module comprising at least one of a parsing module, a unit testing module, a test case document generator, a report generating module.

15. The apparatus according to claim 11, wherein the apparatus may interact with subject software, may produce test case documents, may report unit testing results, and/or may include other interaction or output.

16. A computer program product comprising a non-transitory computer-readable medium having recorded thereon a software program to be executed on a computer, the non-transitory computer readable medium being able to prompt a server in the computer network to perform unit testing of a software module,
   the software module comprising an external interface comprising one or more input variables having unknown values,
   a plurality of possible program execution paths which may result from an execution of said software module,
   each of said program execution paths comprising one or more outcomes of one or more of said conditional expressions comprised in said software module,
   the software program implementing program steps of:
      identifying functional aspects of a piece of software code;
      identifying a plurality of decision/condition statements of the piece of software code;
      estimating an amount of possible test cases based on the plurality of identified decision/condition statements;
      defining a data set over the plurality of identified decision/condition statements;
      defining data sets over the plurality of decision/condition statements, the defining data sets including defining at least two data sets for each of said identified decision/condition statements, a first data set characterized as true and a second data set characterized as false;
      finding subset relationships between all the defined data sets;
      defining a plurality of optimal data sets;
      classifying each decision/condition statement into one of a plurality of decision/condition categories including at least a sequential decision/condition category and a nested decision/condition category;
      refining the plurality of optimal data sets by overlapping at least a subset of the plurality of decision/condition statements based on the decision/condition category classifications of the decision/condition statements, and
      calculating a reduced amount of data sets as compared with the plurality of optimal data sets based on the refined optical data sets the reduced amount comprising an amount that provides optimal coverage with a minimal number of test cases.

17. The computer program product according to claim 16, further comprising receiving programming code having a condition expressed therein.

18. The computer program product according to claim 16, further comprising transforming the code to be tested, either partially or integrally.

19. The computer program product according to claim 16, further comprising
   iteratively repeating steps of:
      finding subset relationships between all the defined data sets;
      defining a plurality of optimal data sets;
      classifying each decision/condition statement into one of the plurality of decision/condition categories;
      refining the plurality of optimal data sets, and
      calculating the reduced amount of data sets until the a diminished amount of data sets is obtained that provides optimum test coverage.

20. The computer program product according to claim 17, further comprises generating a document that includes one or more identified classes, functions, parameter types, and parameters of said piece of software code to be unit tested.

\* \* \* \* \*